Aug. 18, 1970     F. HUGEL     3,524,362
LARGE RATIO PLANETARY FRICTION DRIVE
Filed Aug. 26, 1968
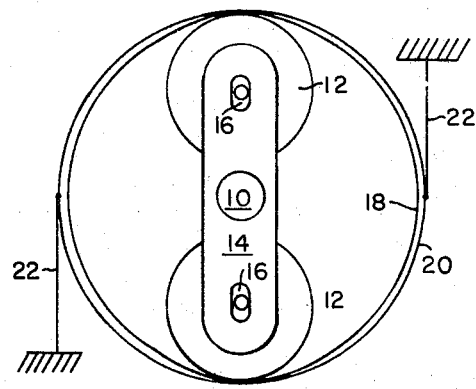
FIG. 1
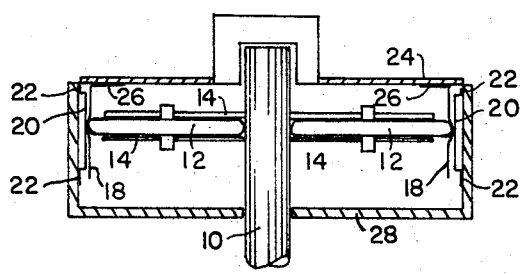
FIG. 2
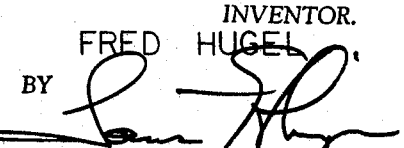
INVENTOR.
FRED HUGEL
BY
ATTORNEY 3,524,362
LARGE RATIO PLANETARY FRICTION DRIVE
Fred Hugel, Boxborough, Mass., assignor to Sanders Associates, Inc., Nashua, N.H., a corporation of Delaware
Filed Aug. 26, 1968, Ser. No. 755,033
Int. Cl. F16h 15/50, 37/02
U.S. Cl. 74—796                                      10 Claims

ABSTRACT OF THE DISCLOSURE

A large ratio epicyclic friction drive is provided wherein a centrally disposed input drive shaft drives a plurality of planet friction wheels. The planet wheels engage the surface of a first resilient band which is disposed within a second resilient band which is fixed in rotation. The first band is thus measured against the second effecting a high ratio reduction of input revolutions.

BACKGROUND OF THE INVENTION

Field of the invention

The present invention relates to epicyclic friction drives and more particularly to low torque friction drives for miniature recording apparatus.

Description of the prior art

Prior to the present invention there has existed an unfulfilled requirement for a very large ratio drive system which could be contained in a minimum size package. Drive mechanisms for miniature recorders are a prime example of the application calling for a large ratio, low torque friction drive. Typically the electric motors which are small enough for use in such recorders are of the high speed type operating in excess of 10,000 r.p.m. Thus a means of drastically reducing this rotating speed is required. The recent prior art may best be typified by U.S. Pat. No. 3,182,525 which issued to D. V. Tinder et al. on May 11, 1965. This patent describes a harmonic epicyclic power actuator wherein planetary rollers cause teeth disposed in the output member and in the drive housing to engage and disengage, thus effecting a speed reduction. Although this is a marked improvement over the previous conventional gearing arrangements, the Tinder et al. system still contains a relatively large number of moving parts and continues the use of toothed gears which are well known as being a source of noise and subject to wear. Particularly in applications to recorders the wear of gear teeth results in undesirable speed variations and backlash. Further, gears are known to cause flutter in recorders; i.e., the gear noise modulates the recorded signal.

OBJECTS AND SUMMARY OF THE INVENTION

Thus it is a primary object of the present invention to provide a new and novel epicyclic friction drive.

It is another object of the present invention to provide apparatus of the above-described character having a large ratio of input to output speeds.

It is an additional object of the present invention to provide apparatus of the above-described character which employs friction surfaces rather then toothed gears.

It is a further object of the present invention to provide apparatus of the above-described character having reduced dimensions.

It is still another object of the present invention to provide a new and improved low torque friction drive.

It is yet an additional object of the present invention to provide apparatus if the above-described character which is quiet in operation.

The foregoing objectives are accomplished through the practice of the present invention wherein an input shaft is in frictional engagement with a plurality of planetary friction wheels. These wheels engage the inside surface of a first resilient or output band which is disposed within a second resilient band fixed by flexures at a plurality of points about its outside surface. Each revolution of the friction wheels around the band thus results in revolution of the output band by an amount equal to the difference in the length of the mating surfaces of the first and second bands.

The above and other objects, features and advantages of the present invention will become more apparent from the detailed discussion considered in conjunction with the accompanying drawing. The scope of the invention will be indicated in the claims.

BRIEF DESCRIPTION OF THE DRAWING

FIG. 1 is a schematic end view of the apparatus of the present invention.

FIG. 2 is a cross-section view of the apparatus of FIG. 1.

DESCRIPTION OF THE PREFERRED EMBODIMENT

Turning now to FIG. 1, there is shown an end view of one embodiment of the present invention. A small diameter driver shaft 10 is centrally disposed and frictionally engages a plurality of planet friction wheels 12. The wheels 12 are maintained in position by arms 14 which are rotatably disposed on the driver shaft 10. The arms 14 keep the friction wheels 12 in a fixed relationship with respect to one another around the shaft 10 by slots 16 along the center line of the arms 14. The slots 16 allow the friction wheels 12 to be loaded against the shaft 10 under the influence of spring pressure from the first and second resilient bands 18 and 20 respectively. The outside diameter of the first band 18 is slightly smaller than the inside diameter of the second band 20 and the second band 20 although restrained from rotating by flexure strips 22 which may be attached to a fixed housing 28, is free to deform in an undulating motion.

Although the above-described embodiment is preferred it will be apparent that the first band may be measured directly against the inside wall of the housing with the same effect.

As shown in FIG. 2, which is a cross-section view of the apparatus of FIG. 1, output power may be taken from a disc 24 which is rotatably coupled to shaft 10 and coupled to the first resilient band 18 by flexures 26. Thus the band 18 is permitted to undulate freely but is coupled to the disc 24 in rotation. The flexures 26 are shown in a purely schematic form in FIG. 1 but in practice may be tabs as shown in FIG. 2 which are integrally formed with the bands 18 and 20. This type of flexure is easily bent to facilitate engagement with the output disc 24 and housing 28 as shown, however, it is very stiff in rotation to provide excellent transmission of applied rotational forces.

As the shaft 10 turns in a clockwise direction the friction wheels 12 turn in a counterclockwise direction at a rate which is proportional to the ratio of the diameters of the shaft 10, and the wheels 12. Since the wheels 12 engage the first resilient band 18, under pressure caused by bands 18 and 20, the wheels 12 roll on the inside of the band 18 and carry the arms 14 about the shaft 10 in a clockwise direction at a rate proportional to the ratio of the diameters of the wheels 12 and the first band 18. In so doing the first band 18 is pressed or measured against the inside surface of the second band 20. Since the outside diameter of band 18 is less than the inside diameter of band 20, every revolution of the arms 14 results in band 18 moving to a different position with respect to band 20 by a distance equal to the difference in length of the mating surfaces of bands 18 and 20.

Thus the speed at which the output band 18 rotates is proportional to the rotating speed of the arms 14 and the ratio of the outside diameter of band 18 to the inside diameter of band 20.

As an illustrative example, the present invention permits the fabrication of a friction drive having overall dimensions of about one-half inch in length and about one inch in diameter. The resilient bands 18 and 20 may be as thin as a few thousandths of an inch if one of the elastic alloys such as beryllium-nickel is used. Presuming the bands 18 and 20 to be .005 inch thick, the drive shaft 10 to be .100 inch in diameter, the friction wheel 12 diameter to be .445 inch and the difference between the inside diameter of band 20 and the outside diameter of the band 18 to be .005 inch a reduction ratio of about 2000:1 may be provided. In practice, reduction ratios of between 2500 and 3000:1 are available through the practice of the present invention.

The maximum force which may be transmitted by the apparatus of the present invention is equal to the normal pressure at which the bands 18 and 20 contact one another times the coefficient of friction between the bands. In metal to metal contact the coefficient of friction is generally the limiting factor. Increasing the normal pressure increases the thickness required in the bands 18 and 20 which reduces their deformability.

It will thus be seen that the objects set forth above, among those made apparent from the preceeding description are efficiently attained and since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention therein described, and all statements of the scope of the invention, which, as a matter of language, might be said to fall therebetween.

Having described what is new and novel and desired to secure by Letters Patent, what is claimed is:

1. A reduction drive apparatus comprising
    a generally cylindrical resilient band having an inside and outside surface,
    hollow, generally cylindrical resilient means having an inside diameter larger than the outside diameter of said band, said hollow cylindrical means being constrained against rotation,
    driving means associated with said resilient band and said hollow means for causing at least one point on said resilient band to bear against the inside surface of said hollow cylindrical means, and
    motion producing means associated with said driving means so as to urge said driving means to travel a path around said inside surface of said resilient band whereby said band rotates with respect to said hollow means at a rate dependent upon the difference between the outside circumference of said band and the inside circumference of said hollow means.

2. Apparatus as recited in claim 1 wherein said driving means comprises
    at least one friction wheel disposed within said band in frictional engagement with the inside surface thereof.

3. Apparatus as recited in claim 2 wherein
    there are a plurality of said friction wheels, and
    including means for maintaining said friction wheels in a fixed spatial relationship with respect to one another.

4. Apparatus as recited in claim 2 wherein
    said motion producing means comprises a rotatable input shaft, and
    said friction wheel is a planet wheel in frictional engagement with said shaft.

5. Apparatus as recited in claim 4 wherein
    said input shaft is the output shaft of a motor.

6. Apparatus as recited in claim 1 further including
    output means coupled to said band, said band having flexure means enabling said band to deform in an undulating pattern.

7. Apparatus as recited in claim 6 further including
    a plurality of flexure tabs integrally formed in each of said bands.

8. Apparatus as recited in claim 7 further including
    a generally cylindrical housing around said bands, and
    the flexure tabs of said second band being coupled to said housing, and
    output means coupled to the flexure tabs of said first band.

9. Apparatus as recited in claim 1 wherein
    said band and hollow cylindrical means are formed of an elastic metal alloy.

10. Apparatus as recited in claim 1 wherein
    said hollow means and said resilient band act in concert to exert an inward pressure against said driving means.

References Cited

UNITED STATES PATENTS

| 3,101,009 | 8/1963 | Musser | 74—640 |
| 3,148,560 | 9/1964 | Woodward | 74—796 |
| 3,166,949 | 1/1965 | Lapp | 74—640 X |
| 3,415,144 | 12/1968 | Carson | 74—640 |
| 3,427,898 | 2/1969 | Mayer | 74—640 |
| 3,435,706 | 4/1969 | Humphreys | 74—640 |

ARTHUR T. McKEON, Primary Examiner

U.S. Cl. X.R.

74—640